United States Patent [19]
Kelch et al.

[11] Patent Number: 5,784,144
[45] Date of Patent: Jul. 21, 1998

[54] MULTIFOCAL SPECTACLE LENS

[75] Inventors: Gerhard Kelch, Aalen; Hans Lahres, Aalen-Wasseralfingen; Konrad Saur, Aalen-Waldhausen; Helmut Wietschorke, Aalen-Wasseralfingen, all of Germany

[73] Assignee: Carl-Zeiss-Stiftung, Heidenheim, Germany

[21] Appl. No.: 818,778

[22] Filed: Mar. 14, 1997

[30] Foreign Application Priority Data

Mar. 28, 1996 [DE] Germany ................ 196 12 284.8

[51] Int. Cl.$^6$ .................................................. G02C 7/06
[52] U.S. Cl. ................................................... 351/169
[58] Field of Search ..................... 351/168, 169, 351/170, 171, 172

[56] References Cited

U.S. PATENT DOCUMENTS

| | | | |
|---|---|---|---|
| 4,606,622 | 8/1986 | Fuëter et al. | 351/169 |
| 5,137,343 | 8/1992 | Kelch et al. | 351/169 |
| 5,444,503 | 8/1995 | Kelch et al. | 351/169 |

*Primary Examiner*—Scott J. Sugarman
*Attorney, Agent, or Firm*—Walter Ottesen

[57] ABSTRACT

A multifocal spectacle lens has two optically effective surfaces with powers in the far reference point from −4.0 dpt to +4.0 dpt in the stronger principal section. The spectacle lens has cylinders from 0.0 dpt to 4.0 dpt and an addition of 1.00 dpt to 3.00 dpt. The multifocal area is at least aspherical and can be differentiated continuously at least twice and is not axial symmetrical. The multifocal surface includes a far vision zone, a near vision zone and a progression zone lying between the near and far vision zones. The lens body is configured to incorporate a plurality of features within an elliptical region on the surface of the lens body extending 50 mm measured horizontally and 40 mm measured vertically from the measurement point. These features are all satisfied together within the elliptical region. One of the features is that the near-reference point is at most 21 mm perpendicularly below the far-reference point and displaced by about 2.5 mm toward the edge. Also, a principal viewing line interconnects the far-vision zone and the near-vision zone and the principal viewing line defines a curve swung toward the edge more or less in dependence upon the dioptric power of the far-vision zone and the addition. A predetermined region is formed in the progression zone on both sides of the principal viewing line wherein astigmatic deviation is less than 0.75 dpt.

10 Claims, 5 Drawing Sheets

MULTIFOCAL SPECTACLE LENS

FIELD OF THE INVENTION

The invention relates to a multifocal spectacle lens having a sliding refractive power over a region of the lens.

BACKGROUND OF THE INVENTION

Spectacle lenses of the above kind are also known as progressive (addition) lenses and are disclosed, for example, in U.S. Pat. Nos. 5,444,503 and 5,137,343. That area of the spectacle lens, which effects the desired sliding refractive power of the lens, is also known as the multifocal surface.

A use situation is determined for calculating the multifocal lens. One of such use situations is presented, for example, in DIN 58 208, Part 2, FIG. 6.

The data from DIN 58 208 is used for the object distances, that is, in the near-vision reference point the object distance a=−380 mm for all additions ≦2.50 dpt and a=−1000 mm multiplied by (dpt/additions) for all additions >2.50 dpt.

The rotation-center vertex distance b' from the back vertex of the multifocal lens to the optical eye rotation point Z' is assumed for the defective vision 0.00 dpt to 28 mm. The structural length of the eye and the defective vision are statistically dependent upon each other. Thus, myopic eyes are longer and hyperopic eyes are shorter. For this reason, the approximation is given by b'=28.0−0.2×(the average far-vision zone dioptric power). The frame for multifocal spectacles is normally forwardly inclined so that the multifocal lens (ground and mounted in the spectacle frame) is inclined, on average, approximately 9° to the perpendicular. For this reason, the position of the multifocal lens relative to the eye is fixed. In this use situation, all ray computations, can be carried out to accommodate the wearer of the spectacles, that is, precisely as the ray computations occur when the spectacle lens is worn forward of the eye of the wearer.

Multifocal lenses have been known for many years and are offered by several manufacturers. An example is the multifocal lens of Carl Zeiss, which is commercially available under the product designation "Gradual HS" and is described in U.S. Pat. No. 4,606,622.

Many requirements are imposed on a universally usable multifocal lens, thus: the far-vision zone should have spherical and astigmatic deviations as low as possible for the spectacle wearer because the highest possible visual acuity is required for viewing into the distance. On the other hand, the near-vision zone should be adequately high so that no great unnatural drop in viewing direction is needed for near vision viewing and the usable region of the multifocal lens should be adequately wide.

The region in the progression zone at both sides of the principal viewing line, in which clear viewing is possible, is known as progression channel. The wearer of the spectacles desires that this progression channel should be as wide as possible in order not to be compelled to move the head when viewing objects at mid-distances. The acceptance of every multifocal lens is essentially dependent upon this width.

Requirements with respect to binocular viewing are in addition to the above monocular requirements. If one targets the optimal correction of the spectacle wearer, then the binocular characteristics of the glass deserve special attention.

Binocular viewing arises from the coaction of the eye pair. Binocular spectacle lens characteristics are therefore characteristics of the lens pair.

The requirement for binocular balance for the eye pair requires the equivalence of the lens pair. This equivalence must be given for each viewing direction and is referred to the imaging quality and to the prismatic directional deflection.

Equivalent imaging quality makes possible the same vision right and left and equivalent prismatic directional deflection ensures undisturbed fusion when viewing an object point (in direct viewing) and for customary depth perception when observing the region around the object (in indirect viewing).

All of these monocular and binocular requirements should be satisfied as well as possible for all possible dioptric powers and for all occurring additions.

A certain deficiency of all multifocal lenses is that astigmatic deviations, which prevent a clear viewing, are unavoidable especially in the progression zone laterally of the principal viewing line.

SUMMARY OF THE INVENTION

In view of the above, it is an object of the invention to provide a multifocal spectacle lens having a progression channel as wide as possible and to reduce the lateral imaging errors of this spectacle lens without noticeably affecting the monocular and binocular requirements as to sharpness and compatibility.

In principle, all known multifocal lenses are compromise solutions wherein the unavoidable errors (viewing sharpness reduction, distortion, binocular imbalances) are so distributed that the "important" viewing zones (far zone, progression zone and near zone) are well usable.

The system eye-brain tolerates the above-mentioned imaging errors within certain limits. These limits are different in dependence upon object distance and viewing direction.

With respect to binocular balance, the multifocal lens described in U.S. Pat. No. 4,606,622 can be seen as a successful compromise.

The special feature of the multifocal lens of the invention is the combination of the most important characteristics of a multifocal lens, namely: an extraordinary width of the progression channel with a gentle increase of the astigmatism laterally of the progression channel and a not too intense drop of the average power laterally of the progression channel and of the near zone. The combination of the most important characteristics of the multifocal lens of the invention is optimally balanced for the spectacles wearer. Furthermore, the lens has a correct position for convergence in the entire progression channel. These improvements are achieved in the entire given addition range and for all spherical and astigmatic far zone properties of the region claimed.

The combination of the features defines a multifocal spectacle lens having the highest quality for the user thereof.

The invention is especially advantageous for short progression zones. A reduced maximum value for the astigmatic deviations in the center regions of the spectacle lens is advantageous.

BRIEF DESCRIPTION OF THE DRAWINGS

The invention will now be described with reference to the drawings wherein:

FIG. 3b shows the elevations of the lower portion of the forward surface of the multifocal lens which form the basis of the computations of FIGS. 1 and 2;

DESCRIPTION OF THE PREFERRED EMBODIMENTS OF THE INVENTION

Figure 1:
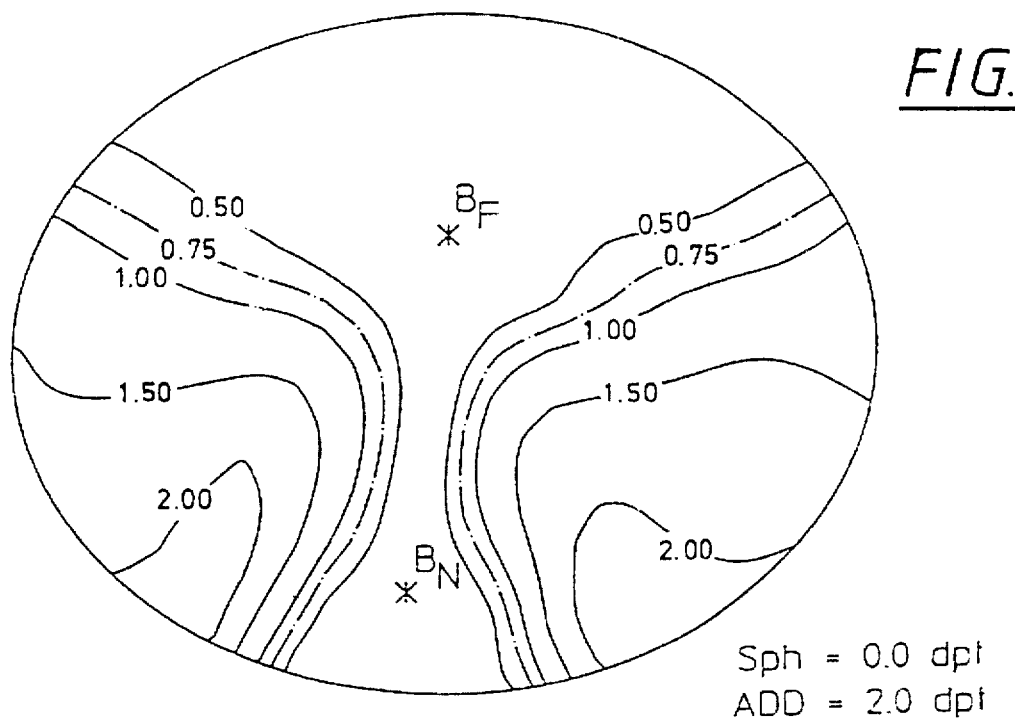
FIG. 1 is an elliptical measuring zone of a multifocal spectacle lens of the invention and shows the astigmatic deviations of the multifocal lens with a far zone power of 0.00 dpt and the addition of 2.00 dpt in the average use situation.

The multifocal lens shown in the drawings has a far-vision zone in the upper portion and a near-vision zone in the lower portion thereof. The progression zone lies between these two zones.

In the following, the term stH represents the absolute strongest principal section of the power in the far reference point for the spectacles wearer. The spectacle lenses mounted in a frame have an inclination of 9°. The spacing of the eye side surface of the spectacle lens from the optical eye rotation point is 28–0.2 average power (in millimeters).

If the user of such a spectacle lens allows the straight-ahead viewing to go from top to bottom, then the pregiven refractive value variation at each inclination of the view determines the distance of the sharply imaged object. A corresponding inward movement of the eye pair belongs to each object distance.

For this reason, the viewing rays of each eye pass through the multifocal surface along a very specific line for the viewing movement described above, namely, the principal viewing line. This line is a curve swung toward the nose on the multifocal surface. The line partitions the surface into a nasal and a temporal region.

The multifocal lens has a far reference point in which the dioptric power (sphere, cylinder, axis), which is determined for viewing into the distance, is realized and a near reference point in which the power is provided, which is necessary for comfortable near viewing.

Figure 5:
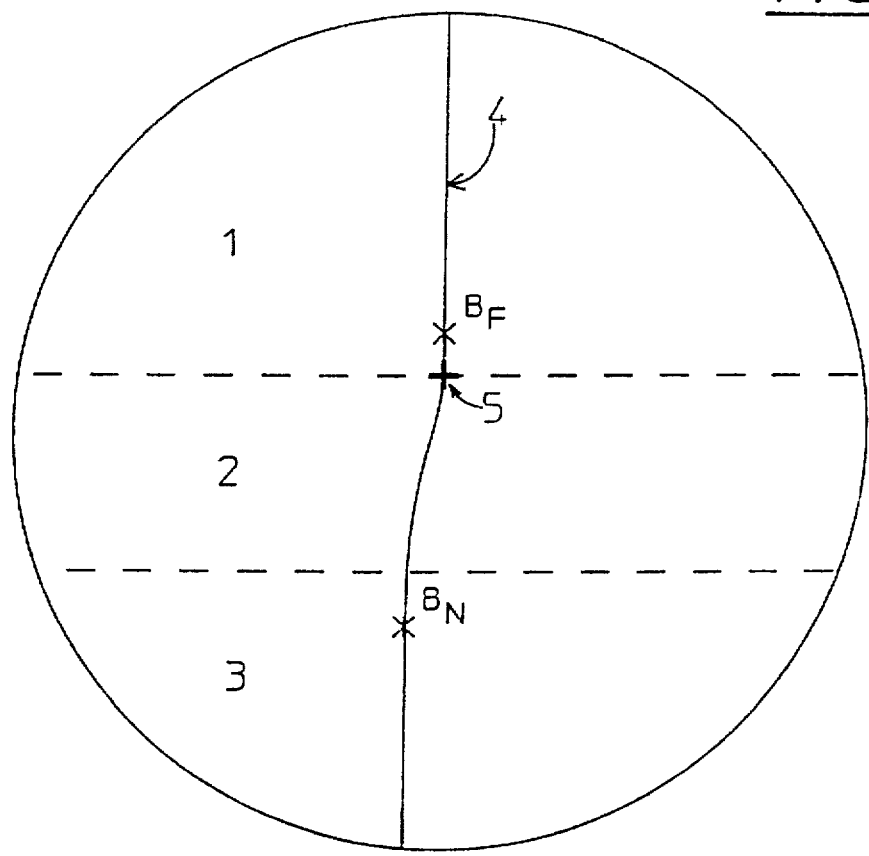
FIG. 5 shows a multifocal lens having a far-vision zone 1, a progression zone 2, a near-vision zone 3, a principal viewing line 4 and a centering cross 5; and, FIG. 6 is a known multifocal lens in an average use situation forward of the eye having the optical eye rotation point Z' and the rotation-center vertex distance b'.
Figure 6:
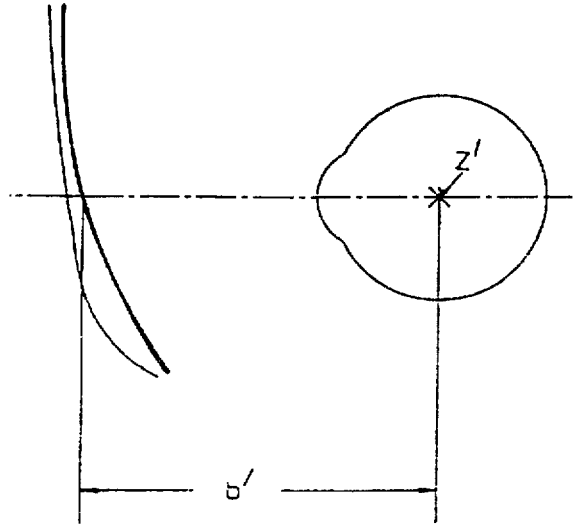

Multifocal lenses are normally supplied with a cross stamped thereupon, the so-called centering cross. This cross lies preferably 3 mm perpendicularly below the far reference point. The optician then grinds the multifocal lens into the spectacles frame so that the centering cross is forward of the pupil center when viewing straight ahead (see FIG. 5).

The muiltifocal lens is normally provided with a so-called thickness reduction prism having a size which is dependent upon the addition and having a base position of 270°.

Preferably, the following table is used for determining the values to be utilized.

| Add (dpt) | 1.00 | 1.25 | 1.50 and 1.75 | 2.0 | 2.25 and 2.50 | 2.75 | 3.00 |
|---|---|---|---|---|---|---|---|
| Prism (cm/m) | 0.50 | 0.75 | 1.00 | 1.25 | 1.50 | 1.75 | 2.00 |

This prism serves not only to correct an angular vision defect, but is intended to ensure that the peripheral thicknesses above and below are approximately the same.

The invention is limited to multifocal spectacle lenses having a spherical power in the far reference point of between −4.00 dpt and +4.00 dpt and having an astigmatic effect (cylinder) which lies between 0.00 dpt and +4.00 dpt. Furthermore, neither of the two principal sections may be greater than 4.00 dpt in magnitude. The position of the axis of the cylinder can be between 0° and 180°.

The range of the addition extends from 1.00 dpt to 3.00 dpt. The addition is here selected in accordance with ISO/DIS 8980-2, paragraph 5.1.1 in the as-worn position.

At least one of the two surfaces of the multifocal lens is an aspheric surface which can be differentiated continuously at least twice and which has a far-vision zone in its upper portion and a near-vision zone in its lower portion and includes a progression zone between these two parts.

The spacing from the far reference point to the near reference point amounts to at most 21 mm. The far reference point lies ideally on the principal viewing line in order to consider the convergence of the eye pair for near objects; however, the near reference point is displaced for all powers and additions by 2.5 mm toward the nose in order to have a uniform position of the measuring point for the near measurement values (see FIG. 5).

The width of the progression channel is essentially dependent upon the length of the progression zone.

A progression zone, which is too long, displaces the near vision zone too far downwardly so that it is no longer usable with the head and body in a comfortable position and a progression zone, which is too short, narrows the progression channel unnecessarily.

According to the invention, an optimum is achieved when the power increases essentially linearly by 75% of the addition on a length of maximally 11 mm along the principal viewing line. The linear increase causes the progression channel to be uniformly wide and no narrow locations arise.

The width of the progression channel, that is, the width of the region for clear viewing, is defined by the region in which the astigmatic deviation is less than 0.75 dpt. Such an astigmatic deviation reduces somewhat the viewing sharpness but only so that no negative effect is perceived for most viewing tasks. It is known, for example, that for reading newspaper print, a vision of 0.5 is sufficient. The minimum width of the progression channel is dependent upon the addition (ADD) and the power in the stronger principal section in the far reference point (stH).

The compatibility of a multifocal lens is dependent, inter alia, on the maximum astigmatic deviation in the lateral regions.

The greater the astigmatic deviation, the more the spectacles wearer experiences discomfort when looking about. This is dependent on the haziness caused thereby, as well as on the rocking movements induced thereby.

The advantageous values for the minimum width of the usable progression zone (astigmatic deviations less than 0.75 dpt) are listed in the following table:

| stH/ADD | 1.0 | 1.25 | 1.50 | 1.75 | 2.00 | 2.25 | 2.50 | 2.75 | 3.00 |
|---|---|---|---|---|---|---|---|---|---|
| −4.00 | 15.1 | 10.8 | 7.9 | 5.9 | 4.7 | 4.1 | 3.8 | 3.5 | 3.0 |
| −3.00 | 14.9 | 10.7 | 7.8 | 5.9 | 4.7 | 4.1 | 3.8 | 3.5 | 3.0 |
| −2.00 | 14.3 | 10.4 | 7.6 | 5.8 | 4.7 | 4.1 | 3.8 | 3.5 | 3.0 |
| −1.00 | 13.3 | 9.8 | 7.4 | 5.7 | 4.7 | 4.1 | 3.8 | 3.5 | 3.0 |
| .00 | 12.2 | 9.2 | 7.1 | 5.6 | 4.7 | 4.1 | 3.8 | 3.4 | 3.0 |
| +1.00 | 11.0 | 8.5 | 6.7 | 5.5 | 4.6 | 4.1 | 3.7 | 3.3 | 2.9 |
| +2.00 | 9.8 | 7.8 | 6.4 | 5.3 | 4.5 | 4.0 | 3.6 | 3.2 | 2.7 |
| +3.00 | 8.9 | 7.3 | 6.0 | 5.1 | 4.4 | 3.9 | 3.4 | 3.0 | 2.6 |
| +4.00 | 8.3 | 6.8 | 5.7 | 4.8 | 4.2 | 3.7 | 3.3 | 2.9 | 2.5 |

It is advantageous to maintain the maximum astigmatic deviations as low as possible. According to the invention, this leads to values which, in turn, show a dependence upon the addition.

These values are limited only in the area of multifocal lenses through which viewing does not take place or only very rarely takes place.

This region is defined by an ellipse having an expansion of 50 mm in the horizontal and a distance of 40 mm in the vertical direction. These directions are about a point which is 4 mm perpendicularly below the centering cross. Only points are outside of this ellipse which are either ground away when fitted into the frame or which are utilized only rarely with direct viewing.

The average power in the lower region of the multifocal lens drops off toward the side because of the power increase and because of the requirement for the smallest possible astigmatic deviations in the lateral regions. This would limit the width of the usable near region and lead to rocking movements.

These disadvantages are significantly reduced in that, and according to the invention, the average power does not drop below a limit value dependent upon the addition (see FIG. 2).

It has been shown that all of these characteristics can be realized in a multifocal lens utilizing known methods for defining surfaces and optimization. These characteristics define an optimal balance which has not heretofore been achieved between requirements which at first appear to be mutually exclusive.

An advantageous embodiment of the invention is achieved when the spherical and astigmatic deviations exhibit approximately the same values in the through-view points which correspond to binocular viewing. In-house experiments with respect to wearing the spectacles were conducted and it was determined that the wearer perceives it to be comfortable when the right and left eye experience equal viewing impressions.

Furthermore, it has been found that excellent compatibility of the spectacle lenses forward of the eyes is advantageous when the binocular viewing is affected as little possible in the region delimited by the above-mentioned ellipse.

This is achieved in that the vertical direction differences are held to less than 0.5 cm/m. Then, the eye pair is not compelled to carry out unnatural motoric fusion movements and double images are avoided. The value of 0.5 cm/m is, for example, given in the RAL-RG 915 as permissible prismatic deviation for binocular viewing.

It is further advantageous that the objects can be clearly perceived when viewing laterally in the far vision zone.

For this purpose, the astigmatic deviations are limited in dependence upon the addition. For small additions, the limitations can be held very low and for larger additions, it is advantageous to accept greater limitations in order to not noticeably affect the remaining requirements.

The limitations are of an order of magnitude which are no longer perceived to be disturbing by the spectacles wearer after a given time needed for acclimatization.

A further advantageous configuration is provided in that an astigmatic deviation is permitted along the principal viewing line which does not noticeably affect the clear viewing.

This is assuredly so when no more than 0.5 dpt astigmatic deviation is permitted. In this way, a degree of freedom is provided for minimizing the remaining imaging errors.

Likewise, it can be advantageous to so configure the multifocal area facing toward the object that sections of horizontal planes define curves with the multifocal surface in the upper portion of the progression zone having a radius of curvature toward the side which is first noticeably increasing and then noticeably decreasing. The curvatures at first reduce noticeably at the position of the multifocal surfaces facing toward the eye and then again increase. This characteristic facilitates the optimal fulfillment of all stated requirements.

When measuring multifocal lenses in the vertex refractive value measuring apparatus, the measuring values can be read off easier and with greater precision the lower the spherical and astigmatic deviations vary within the measuring circle.

In the far measuring circle, measurements are conventionally made with a beam having a diameter of approximately 7 mm and in the near measuring circle with a measuring beam of approximately 4 mm diameter.

With respect to spherical deviations in the near measurement circle, the multifocal spectacle lens has an advantageous configuration when the prescribed near power is already reached 1 mm above the near measurement point. In this way, the spherical deviations within the near measurement circle are low.

Figure 2:
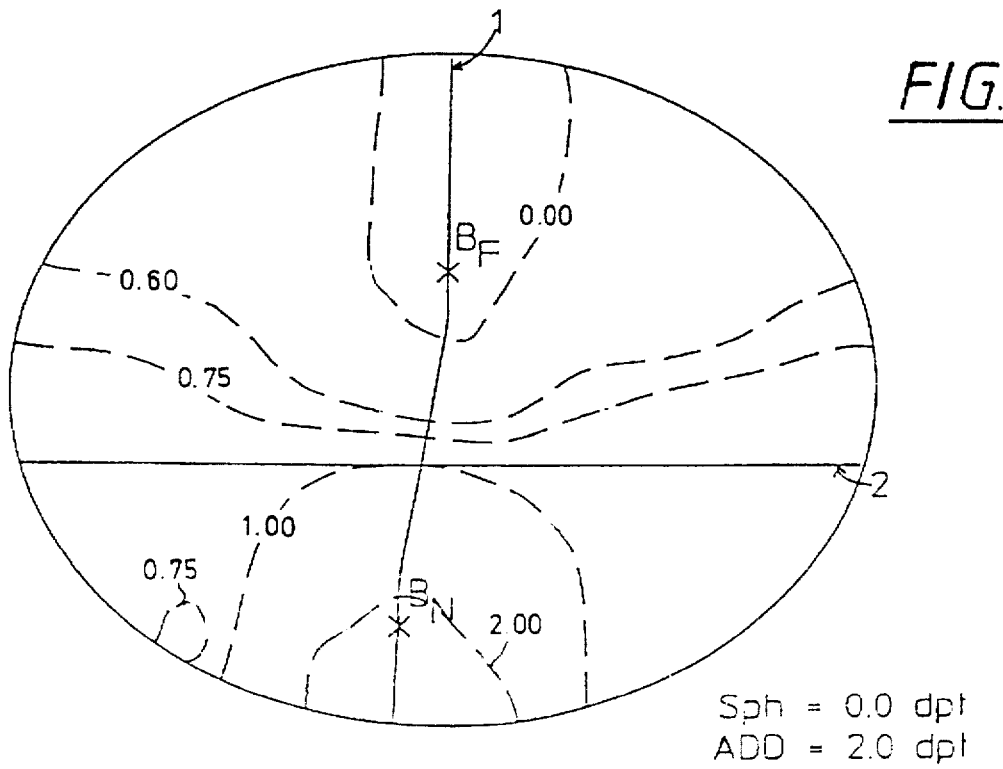
FIG. 2 shows, within the elliptical measuring zone, the increase of the average power of the multifocal lens of the invention with a far zone power of 0.00 dpt and the addition of 2.00 dpt in the average use situation. The principal viewing line 1 is intercepted by the horizontal line 2 at that location at which the increase of power is just 1.00 dpt. Under the line 2, the average power is overall more than 0.60 dpt greater than in the far reference point.
Figure 3A:
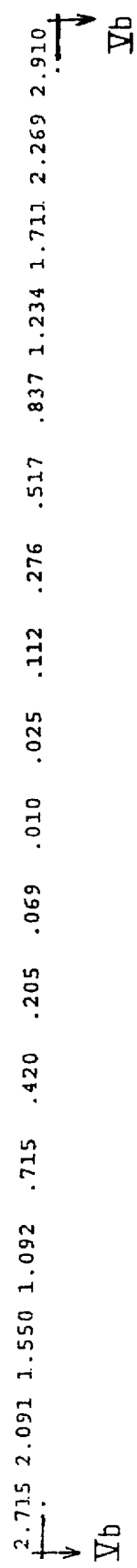
FIG. 3a shows the elevations of the upper portion of the forward surface of the multifocal lens which form the basis of the computations of FIGS. 1 and 2.
Figure 3B:
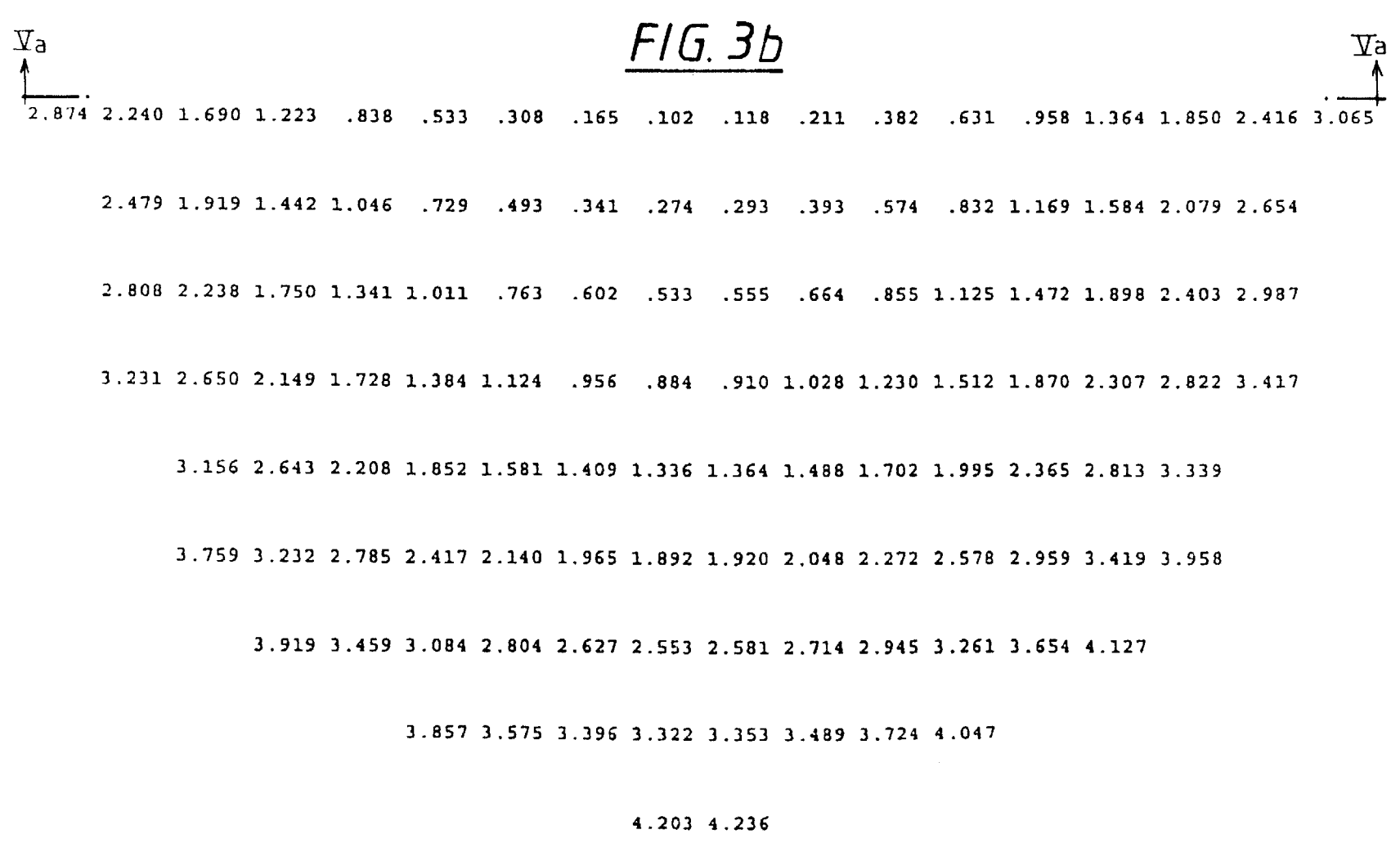
Figure 4:
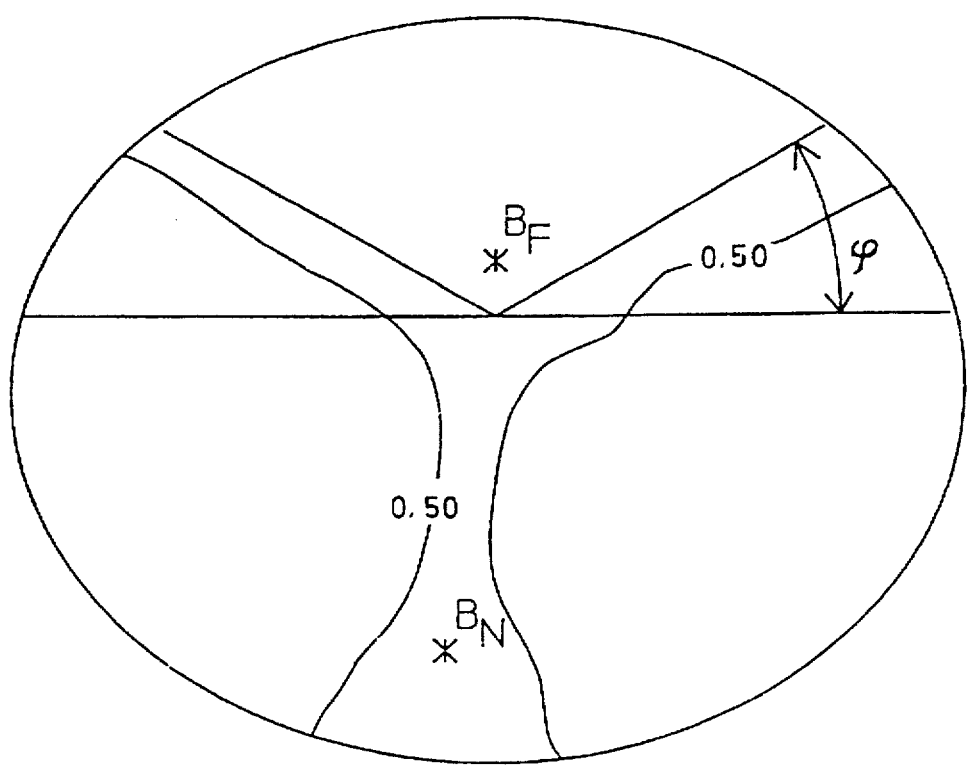
FIG. 4 shows the delimitation of the region in the far-vision zone wherein the astigmatic deviations are held low in the elliptical measuring zone.

An example of the invention is presented in FIGS. 1 to 3. The far power is 0.00 dpt and the addition is 2.00 dpt. The material has the refractive index of 1.600 and the center thickness is 2.5 mm and the thickness reduction prism is 1.25 cm/m with a basis of 270°.

FIG. 1 shows the astigmatic deviations and FIG. 2 the increase of the power starting from the far reference point. FIG. 3 shows the elevations of the forward surface which generates the sliding power in a raster of 3 mm by 3 mm.

The certainty that the best possible compromise for the great majority of spectacle wearers in this operating range has been found with the fulfillment of these requirements is obtained by conducting experiments with persons wearing the spectacles. These experiments were conducted in-house and confirm the selected design.

The multifocal lenses of the invention can be made with silicate or with organic material (for example, CR39) with the particular available refractive indexes. The forward and rearward surfaces, or both surfaces, of the multifocal lens can be configured as multifocal surfaces depending upon the method of manufacture and depending upon economic considerations.

Furthermore, the corresponding multifocal lenses can be computed for other average use situations.

It is understood that the foregoing description is that of the preferred embodiments of the invention and that various changes and modifications may be made thereto without departing from the spirit and scope of the invention as defined in the appended claims.

What is claimed is:

1. A multifocal spectacle lens comprising:

a lens body having two optically effective surfaces;

said lens body further having a center cross and a measurement point disposed 4 mm vertically below said center point;

said lens body having a far-reference point and a dioptric power at said far-reference point from −4 dpt to +4 dpt in the absolute strongest principal section (stH);

a cylinder of 0.0 to 4.0 dpt and an addition (ADD) of 1.00 to 3.00 dpt;

at least one aspheric nonaxialsymmetric multifocal surface which can be differentiated continuously at least twice;

said multifocal surface having a far-vision zone, a near-vision zone and a progression zone disposed between said far-vision and said near-vision zones;

said lens body having an edge facing toward the nose of a person wearing said spectacle lens;

said lens body being configured to incorporate a plurality of features within an elliptical region on the surface of said lens body extending 50 mm measured horizontally and 40 mm measured vertically from said measurement point;

said features all being satisfied together within said elliptical region and including:

(a) said near-reference point being at most 21 mm perpendicularly below said far-reference point and displaced by about 2.5 mm toward said edge;

(b) a principal viewing line interconnecting said far-vision zone and said near-vision zone; and, said principal viewing line defining a curve swung toward said edge more or less in dependence upon the dioptric power of said far-vision zone and said addition;

(c) a predetermined region formed in said progression zone on both sides of said principal viewing line wherein astigmatic deviation is less than 0.75 dpt;

(d) said predetermined region having a minimum width (in millimeters) measured horizontally as shown in the following table:

| stH/ADD | 1.0 | 1.25 | 1.50 | 1.75 | 2.00 | 2.25 | 2.50 | 2.75 | 3.0 |
|---|---|---|---|---|---|---|---|---|---|
| −4.00 | 15.1 | 10.8 | 7.9 | 5.9 | 4.7 | 4.1 | 3.8 | 3.5 | 3.0 |
| −3.00 | 14.9 | 10.7 | 7.8 | 5.9 | 4.7 | 4.1 | 3.8 | 3.5 | 3.0 |
| −2.00 | 14.3 | 10.4 | 7.6 | 5.8 | 4.7 | 4.1 | 3.8 | 3.5 | 3.0 |
| −1.00 | 13.3 | 9.8 | 7.4 | 5.7 | 4.7 | 4.1 | 3.8 | 3.5 | 3.0 |
| .00 | 12.2 | 9.2 | 7.1 | 5.6 | 4.7 | 4.1 | 3.8 | 3.4 | 3.0 |
| +1.00 | 11.0 | 8.5 | 6.7 | 5.5 | 4.6 | 4.1 | 3.7 | 3.3 | 2.9 |
| +2.00 | 9.8 | 7.8 | 6.4 | 5.3 | 4.5 | 4.0 | 3.6 | 3.2 | 2.7 |
| +3.00 | 9.8 | 7.3 | 6.0 | 5.1 | 4.4 | 3.9 | 3.4 | 3.0 | 2.6 |
| +4.00 | 8.3 | 6.8 | 5.7 | 4.8 | 4.2 | 3.7 | 3.3 | 2.9 | 2.5 | and said minimum width being dependent upon said strongest principal section (stH) in said far-reference point and said addition (ADD); and, (e) a horizontal line intersecting said principal viewing line to define an intersect point; half of said addition (ADD) being achieved below said horizontal line at said intersect point; and, the mean dioptric power being greater than the mean dioptric power at said far-reference point by values dW given in the following second table:

| Add in dpt | 1.00 | 1.25 | 1.50 | 1.75 | 2.00 | 2.25 | 2.50 | 2.75 | 3.00 |
|---|---|---|---|---|---|---|---|---|---|
| dW in dpt. | 0.20 | 0.30 | 0.35 | 0.50 | 0.60 | 0.60 | 0.65 | 0.70 | 0.70 |

2. The multifocal spectacle lens of claim 1, said center cross being vertically below said far-reference point at a distance of about 3 mm; the dioptric power in said progression zone being essentially linear along said principal viewing line along a length of at most 11 mm increasing at 75% of said addition (ADD); the maximum astigmatic deviation Amax in dpt is given by the following equation for ADD $\leq$ 1.50 dpt:

$$A_{max} \leq (1.13 + 0.070 \ast stH + 0.016 \ast stH^2) \ast ADD$$

and, the maximum astigmatic deviation Amax in dpt for ADD $\geq$ 1.75 dpt is given by the following equation:

$$A_{max} \leq (1.16 + 0.025 \ast stH + 0.004 \ast stH^2) \ast ADD.$$

3. The multifocal spectacle lens of claim 1, wherein two points corresponding to binocular viewing are disposed on respective sides of said principal viewing line; and, approximately the same values for the spherical and astigmatic deviation are obtained at each of said two points.

4. The multifocal spectacle lens of claim 1, wherein the prismatic dioptric powers nasally and temporally of said principal viewing line are so selected with respect to the through-view points corresponding to binocular viewing that the vertical direction differences in direct viewing are not greater than 0.5 cm/m.

5. The multifocal spectacle lens of claim 1, wherein, in the far-vision zone, the astigmatic deviation is less than 0.5 dpt for all points having $\phi > 45 - 30/ADD$; and, said angle $\phi$ being measured in degrees with respect to the horizontal on said center cross.

6. The multifocal spectacle lens of claim 1, wherein an astigmatic deviation is present in the progression zone along said principal viewing line; said astigmatic deviation being close to zero dpt in the upper region of said progression zone and less than a value of 0.50 dpt in the further course.

7. The multifocal spectacle lens of claim 1, wherein curves are present in the upper portion of said progression zone at the intersection of said multifocal surface with horizontal planes; said curves having a curvature at the side of said multifocal area which faces toward an object starting in the vicinity of the edge of said progression zone of good vision, to the edge of said lens with said curvatures first noticeably increasing and again decreasing; and, for the location of the multifocal region facing toward the eye, said curvatures first decreasing significantly and again increasing.

8. The multifocal spectacle lens of claim 1, wherein, within a first circle about said far-reference point and said first circle having a diameter of 7 mm and within a second circle about said near-reference point and said second circle having a 4 mm diameter, the astigmatism of any desired ray, which runs perpendicular to the eye-side surface of the multifocal lens, is different by at most 0.11+0.02* ADD dpt from the astigmatism of the correspondingly running measurement ray through the particular reference point.

9. The multifocal spectacle lens of claim 1, wherein, within a first circle about said far-reference point and said first circle having a diameter of 7 mm and within a second circle about said near-reference point and said second circle having a 4 mm diameter, the astigmatism of any desired ray, which runs perpendicular to the eye-side surface of the multifocal lens, is different by at most 0.17 dpt from the astigmatism of the correspondingly running measurement ray through the particular reference point.

10. The multifocal spectacle lens of claim 1, wherein 100% of the required additions in a point are obtained which lies at least 1 mm vertically above the near-reference point.

* * * * *